United States Patent
Hwang et al.

(10) Patent No.: US 7,373,234 B1
(45) Date of Patent: May 13, 2008

(54) METHOD FOR DETERMINING SOLENOID CONTROL CURRENT USING HYSTERESIS INTERPOLATION FOR TRANSMISSION CLUTCH CONTROL

(75) Inventors: KyoungPil Hwang, Ann Arbor, MI (US); Andrew D. Herman, Grand Blanc, MI (US); Michael Kozan, Canton, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/782,323

(22) Filed: Jul. 24, 2007

(51) Int. Cl.
    *G06F 7/00* (2006.01)
(52) U.S. Cl. .......................... 701/60; 701/68
(58) Field of Classification Search .................. 701/51, 701/52, 58, 60, 67, 68; 477/166, 168; 475/33, 475/125
    See application file for complete search history.

(56) References Cited

U.S. PATENT DOCUMENTS

| | | |
|---|---|---|
| 3,846,675 A | 11/1974 | Shimp |
| 4,106,368 A | 8/1978 | Ivey |
| 5,109,692 A | 5/1992 | Fitzgerald |
| 5,249,658 A | 10/1993 | Goeckner et al. |
| 5,400,678 A | 3/1995 | Jain et al. |
| 5,737,979 A | 4/1998 | McKenzie et al. |
| 6,055,475 A | 4/2000 | Moriyama |
| 6,308,725 B1 | 10/2001 | Lawlyes et al. |
| 6,736,755 B2 * | 5/2004 | Kato ............................ 477/92 |
| 6,751,542 B2 | 6/2004 | Ishii et al. |
| 6,779,540 B2 | 8/2004 | Ishii et al. |
| 6,895,798 B2 | 5/2005 | Sosnowski |
| 6,896,641 B2 * | 5/2005 | Matsumura et al. ........ 477/115 |
| 6,994,647 B2 | 2/2006 | Cicala et al. |
| 7,037,236 B2 | 5/2006 | Ishibashi et al. |
| 7,285,071 B2 * | 10/2007 | Nakajima et al. ........... 477/107 |
| 7,292,922 B2 * | 11/2007 | Chen et al. .................... 701/51 |
| 2006/0172853 A1 | 8/2006 | Ishibashi et al. |

* cited by examiner

*Primary Examiner*—Richard M. Camby
(74) *Attorney, Agent, or Firm*—Paul L. Marshall

(57) ABSTRACT

A transmission control arrangement controls the generation of a required solenoid control current that is provided to an electro-hydraulic pressure control module to ultimately control clutch pressure. The module includes a linear solenoid, which has an up direction pressure-current (P-I) data table and a down direction pressure-current (P-I) data table associated therewith. For large pressure increase change requests the up P-I table is used. For large pressure decrease change requests the down P-I table is used. An interpolation process uses current values taken from both the up and down P-I data tables for pressure change requests that are neither large increases nor large decreases. The control arrangement also includes a variable gain feature that changes the gain in dependence on the gear state of the transmission.

5 Claims, 3 Drawing Sheets

METHOD FOR DETERMINING SOLENOID CONTROL CURRENT USING HYSTERESIS INTERPOLATION FOR TRANSMISSION CLUTCH CONTROL

TECHNICAL FIELD

The present invention relates generally to improvements in clutch pressure controls for a vehicle automatic transmission and more particularly to a method for determining solenoid control current using hysteresis interpolation for transmission clutch pressure control.

BACKGROUND OF THE INVENTION

Hydraulic fluid controls can be found in a variety of automotive applications such as automatic speed change transmissions as well as others. In these applications, it is often desirable to control the pressure of the hydraulic fluid, as seen by reference to U.S. Pat. No. 6,308,725 entitled "APPARATUS FOR CONTROLLING HYDRAULIC FLUID PRESSURE" issued to Lawlyes et al., assigned to the common assignee of the present invention. Lawlyes et al. disclose a smart actuator including a solenoid element and a pressure sensor element, both of which are in electrical communication with a remote control through a wire harness. Lawlyes et al. provide for remote pressure sensing of a solenoid output.

In the specific context of an automatic speed change power transmission, it is known to use electronic transmission control units that are configured to generate electrical signals that control solenoids resulting in the control of fluid flow as well as the pressure in a hydraulic fluid line. As known, the pressure in a hydraulic fluid line can be used to control various other elements in an automatic transmission system including for example a hydraulically-actuated clutch for the engagement of individual gears. By engaging various combinations of gears (e.g., planetary gears in a planetary gear transmission), an automatic transmission system accomplishes the same task as the shifting of gears in a manual transmission. Hydraulically-actuated clutches that are found in transmissions are typically used for engaging a pair of gears (e.g., a pair of rotating members, or alternatively, one rotating member and one non-rotating member) together such that when the clutch is applied, torque can be transmitted from one shaft to the other. Shift changes may also include switching three or more clutches on occasion for certain types of shifts, and herein references to two clutch type shifts could also include the multiple shifts.

An important operating aspect of a hydraulically operated clutch relates to the pressure build-up of the applied hydraulic fluid. In general, fluid flow at a certain applied pressure is sought to be controlled and varied to apply the clutch in order to obtain a desired engagement characteristic, principally with respect to timing and smoothness. It should be appreciated that if the timing of the engagement of one gear with the disengagement of another gear is not coordinately properly, overall shift performance may suffer. It is thus desirable and known in the art to control the clutch pressure.

In this regard, it is known to provide a linear solenoid to control the hydraulic fluid pressure to apply and/or release the clutch. In a linear solenoid, the amount of fluid at a controlled pressure can be varied by changing a solenoid control current. To achieve control of a system including a linear solenoid, it is known to employ software responsive to various inputs to control the current provided to the solenoid. However, the pressure output of a linear solenoid differs in dependence on the control current direction. More specifically, a transition from a relatively low control current to a relatively high control current is considered an increasing or "up" direction. Likewise, transitioning from a relatively high control current to a relatively low control current is considered a decreasing or "down" direction. A linear solenoid typically has a pressure-current (P-I) characteristic curve for each direction. Thus, for any desired control pressure value, the required solenoid current would generally depend on whether the direction of the transition to the desired control pressure is "up" or "down".

One approach in the art for determining the required solenoid current to achieve a desired pressure provides for an "up" direction P-I table and a down direction P-I table. Then, during operation, the control determines what table to use based on current direction, and then extracts the required solenoid control current from the one selected P-I table. Further, under this conventional approach, calculating the required solenoid current may involve interpolation within the one selected table (e.g., where the desired control pressure is not exactly found in the data pairs in the table, the desired current may be interpolated from the nearest data pairs). One shortcoming of this approach however is that the data in each of the "up" and "down" P-I tables are generally most accurate for the specific conditions under which they were captured. Using the tables under different conditions results in undesired variance.

It is also known to use a linear solenoid in combination with other hydraulic fluid control devices. One example that may be used in an automatic speed change transmission may be a two-stage pressure control module, where the first stage is a linear solenoid (e.g., variable bleed solenoid—VBS) providing a pilot or control pressure in response to an input command (i.e., a solenoid control current) and where the second stage includes a spool valve configured to regulate a main fluid supply pressure in accordance with the control pressure. The spool valve outlet is coupled to a hydraulic circuit that includes a hydraulically-actuated clutch. In this configuration, a transmission control unit (TCU) or the like is responsible for shift control and develops a desired clutch pressure command based on available information. Then, the clutch pressure command is converted into a desired control pressure (i.e., in the 2-stage arrangement described above, the required pressure output from the linear solenoid to achieve the commanded clutch pressure). Finally, the control pressure is converted into the appropriate control current to feed to the solenoid. However, it has been observed that this type of hydraulic system may have differing gains depending on what gear the transmission is in. This multi-gain characteristic of the solenoid can cause undesirable variations in the actual clutch pressure relative to the commanded clutch pressure.

There is therefore a need for a method for transmission clutch control that minimizes or eliminates one or more of the problems set forth above.

SUMMARY OF THE INVENTION

One advantage of the present invention is that it provides an improved accuracy as compared to conventional approaches. A method is provided for controlling a solenoid in a solenoid-operated electro-hydraulic pressure control module where a solenoid output pressure defines a control pressure that varies in accordance with a solenoid control current. The method includes a number of steps. The first step involves providing an up-characteristic data structure including data corresponding to an up control pressure versus solenoid control current (P-I) characteristic for increasing control pressure. The next step involves providing a down-characteristic data structure including data corresponding to a down control pressure versus solenoid control current (P-I) characteristic for a decreasing control pressure. The data structures may be embodied in up and down P-I tables.

The next step involves determining an up/down direction parameter between the present control pressure (e.g., this may be represented by the prior control pressure command) and a desired control pressure (e.g., this may be represented by a new, commanded control pressure). Next, obtaining a pair of current values from the up-characteristic data structure and the down-characteristic data structure in accordance with the commanded (desired) control pressure.

The next step involves interpolating a required solenoid control current between the pair of current values extracted from the P-I tables. The interpolating step uses the up/down direction parameter, among other criteria, to decide how to interpolate between the current values from the up and down tables. The final step involves applying the required solenoid control current to the solenoid.

In another aspect of the present invention, a method is provided for controlling hydraulic fluid to a clutch in a vehicle automatic speed change transmission where the method utilizes a solenoid gain that is variable in dependence on the gear state of the transmission.

The first step involves providing a solenoid-operated electro-hydraulic pressure control module having an outlet configured to provide fluid at an outlet pressure that is variable in accordance with a control current signal. The module's outlet is in fluid communication with the clutch, and includes a solenoid. The next step involves providing a command pressure indicative of a desired clutch pressure.

The next step involves associating a first gain with the solenoid for a first gear state of the transmission. The next step involves associating a second gain with the solenoid for a second gear state of the transmission. The first and the second gears are different gears. The final step involves determining a control pressure based on the command pressure and one of the first and second gains in dependence on the gear state. Through this method, a more accurate control of the clutch pressure, based on the gear state, can be obtained.

Other features and aspects of the invention are also presented.

BRIEF DESCRIPTION OF THE DRAWINGS

The present invention will now be described by way of example, with reference to the accompanying drawings.

DETAILED DESCRIPTION OF THE PREFERRED EMBODIMENT

Figure 1:
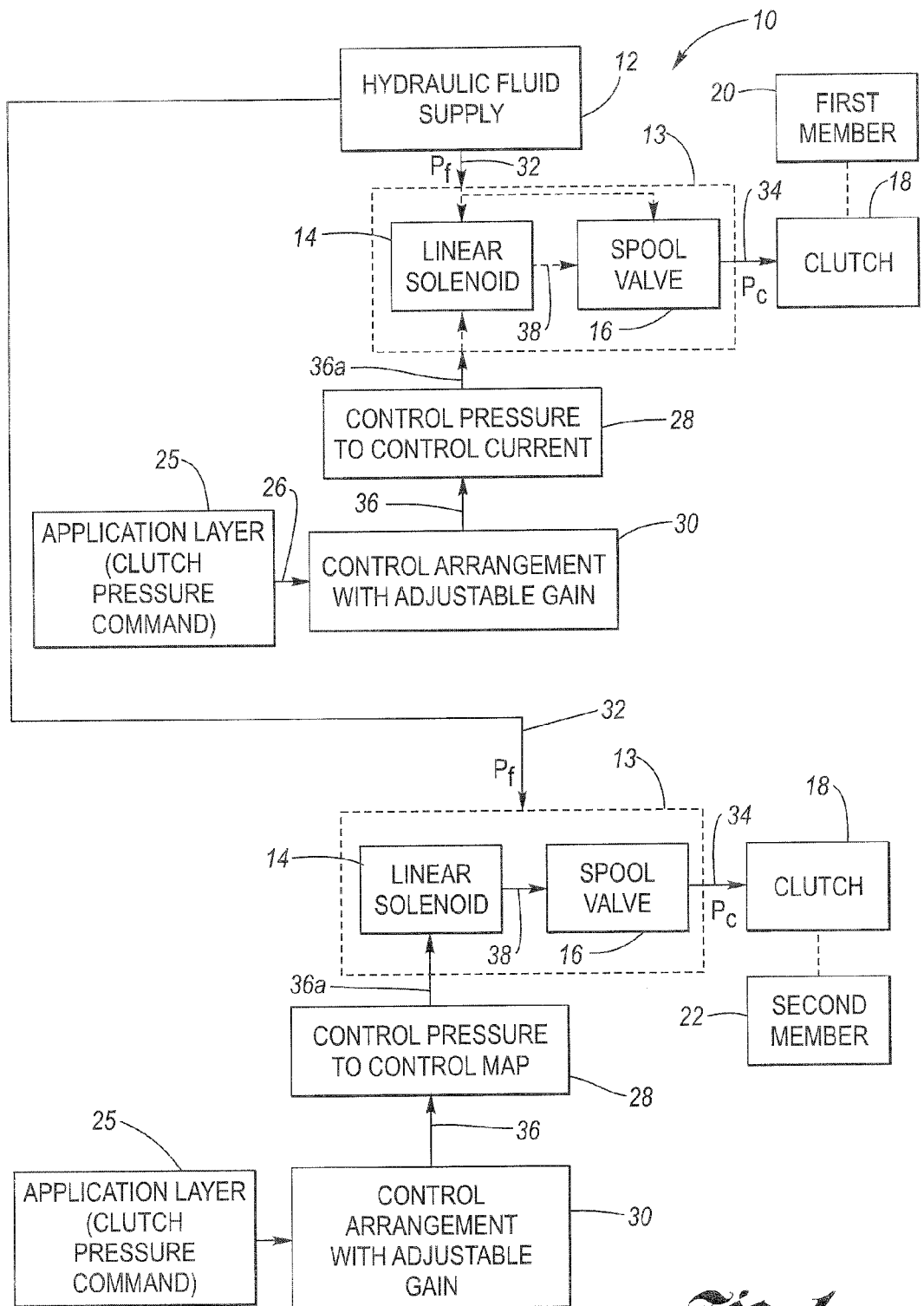
FIG. 1 is a block diagram of an apparatus for clutch pressure control having hysteresis interpolation in accordance with the invention.

Referring now to the drawings wherein like reference numerals are used to identify identical components in the various views, FIG. 1 is a simplified block diagram of an apparatus 10 for controlling clutch pressure. FIG. 1 shows a hydraulic fluid supply 12, an electro-hydraulic pressure control module 13 including a linear solenoid 14 and a pressure regulating valve 16, a hydraulically-actuated clutch 18, a pair of members 20, 22 in a vehicle transmission, a clutch pressure estimator 24, an application control program/layer 25 outputting a clutch pressure command signal 26, a control pressure-to-control current (solenoid current) mapping block 28 with hysteresis interpolation, and a control arrangement 30 with adjustable gain logic. It should be understood that the pair of members 20, 22 in the illustrated embodiment each may be rotating (e.g., gear sets), but this is exemplary only and not limiting in nature. For example, in alternate embodiments, one of the members 20, 22 may comprise a non-rotating member. The illustrated embodiment, however, shows the arrangement for a typical shift. On a clutch-to-clutch transmission, for example, a shift is completed by taking one clutch element on and one clutch element off to ring on the different members. The two control structures are shown in parallel because one would use two different circuits to complete the shift (e.g., there would be two solenoids so the algorithm of the present invention would be duplicated to perform the function on both, which are changing pressure at the same time).

Apparatus 10 may be suitably employed in an automatic speed change power transmission of the type described in the Background section. That is, a transmission of the type having hydraulic fluid-actuated (e.g., piston operated type actuation) clutches (e.g., band type clutch), such as clutch 18, configured such that when applied are operative to engage first and second members (e.g., planetary gears, or other rotating members in one embodiment, or one rotating and one non-rotating member in an alternate embodiment) together so that rotating torque may be transmitted from one member to the other, or to maintain an otherwise rotatable member stationary, or many other arrangements, such as shown in FIG. 1 described above. As also described in the Background, controlling and varying the hydraulic fluid clutch pressure can materially affect the operating characteristic of the clutch and in turn the resulting engagement of gears.

With continued reference to FIG. 1, hydraulic fluid supply 12 includes an outlet that supplies hydraulic fluid through line 32 to electro-hydraulic module 13. Fluid supply 12 may comprise conventional components known to those of ordinary skill in the art, for example, pumps, pressure regulating devices, valves and the like. Fluid supply 12 provides hydraulic fluid at a nominal feed pressure ($P_f$) in accordance with the design requirements of any particular constructed embodiment.

Electro-hydraulic pressure control module 13 has (i) an inlet configured to receive the supply of hydraulic fluid at the feed pressure, which in FIG. 1 is designated Pf, via line 32 as well as (ii) an outlet coupled to a line 34. The outlet is configured to provide hydraulic fluid at a certain fluid flow having an outlet pressure that is variable in accordance with a solenoid control current signal 36a produced by block 28 as a function of a solenoid control pressure signal 36. The module's outlet is in fluid communication with clutch 18 via line 34 and forms a hydraulic fluid circuit therewith. This hydraulic fluid circuit, as known, may include various lines, orifices, and the like and include the hydraulic actuator portion of clutch 18, which may have no fluid accumulator, or only a relatively small accumulator. The clutch pressure developed at clutch 18 is designated as clutch pressure ($P_C$).

Electro-hydraulic pressure control module 13 may include a linear solenoid 14. Linear solenoid 14 may comprise conventional components known to those of ordinary skill in the art. In one embodiment, linear solenoid 14 may comprise a pressure control solenoid (for example, a variable bleed solenoid, or variable flow solenoid), which is a current controlled device that produces a fluid flow at an output pressure on an outlet line 38 that is a function of supply pressure ($P_f$) and an applied current signal (i.e., solenoid control current signal 36a). Additionally, solenoid 14 may be of the type described as being normally "high", meaning that in the absence of an input solenoid current, the output will provide the maximum output pressure, typically an offset from the supply pressure. As the solenoid current is increased, the output pressure on line 38 will decrease. In an alternate embodiment, linear solenoid 14 may comprise a pulse-width modulated (PWM) actuator (not shown) that produces an output pressure as a function of supply pressure and corresponding to the duty cycle of an input drive signal. It should be understood that the present invention is not limited to these two embodiments, which are merely exemplary and not limiting in nature.

Electro-hydraulic pressure control module 13 also includes a pressure regulating valve 16 that is provided with (i) an inlet for receiving a supply of hydraulic fluid as well as (ii) an output configured for connection to clutch 18 via line 34. Valve 16 is configured to provide a fluid flow on line 34 at an output pressure to the clutch that is variable in accordance with a so-called pilot or "control" pressure on line 38 from linear solenoid 14. Pressure regulating valve 16 may be configured to provide flow at a greater level than available with linear solenoid 14, in accordance with the requirements of clutch 18. Valve 16 may comprise conventional components known in the art, for example, in one embodiment, valve 16 may comprise a pilot operated spool valve.

It should be understood that while the described embodiment uses a two-stage module for pressure control that the present invention is not so limited, and may be extended to less than or more than the two-stage illustrated embodiment, and fall within the spirit and scope of the present invention. In addition, for clarity and not by way of limitation, the vocabulary used herein necessarily involves terms specific to a two-stage embodiment, as per its correspondence to the physical two-stage module being described.

Application control program 25 is a higher level control and is configured, for example via programming of a transmission control unit (TCU) or the like, to implement various shifting patterns based on available operating information, such as engine rpm, vehicle speed and other driving conditions. To implement such shifting patterns, as known, the application control program must ultimately cause the engagement and/or disengagement of the various speed change gears, which is accomplished through applying/releasing corresponding clutches. As still further known, the application control program/layer 25 generates a clutch pressure command signal 26, which is a command or signal that is indicative of a desired or commanded clutch pressure. Typically, the application control program 25 generates a clutch pressure profile of the desired clutch pressure level as a function of time, which constitutes the clutch pressure command or signal 26, sometimes referred to herein as the command pressure.

Control pressure-to-control current mapping block 28 is configured to perform the function of mapping a control pressure signal 36 (e.g., as may be expressed in or corresponding to kPa or psi) into a corresponding control or solenoid current signal 36a sufficient to appropriately drive linear solenoid 14 so as to realize the desired control pressure. In accordance with the present invention, mapping block 28 employs hysteresis interpolation to realize improved accuracy in the control pressure and hence by extension via the spool valve 16 in the actual clutch pressure. In general, block 28 includes (i) an up-characteristic data structure including data corresponding to an up control pressure-versus-solenoid control current (P-I) characteristic for increasing solenoid current; (ii) a down-characteristic data structure including data corresponding to a down control pressure-versus-solenoid control current (P-I) characteristic for a decreasing solenoid current; and interpolation logic that selectively interpolates a required solenoid current using current values from both up and down data structures.

Control arrangement 30 with adjustable solenoid gain logic is configured to generate a control pressure signal 36 in response to, among other things, the clutch pressure command signal 26. In the context of FIG. 1, the control pressure is the pressure of the hydraulic fluid delivered by linear solenoid 14 on line 38 to spool valve 16. The control pressure signal 36 is indicative of the desired control pressure being delivered by solenoid 14. While the adjustable solenoid gain feature will be described in greater detail below, in all other respects, control arrangement 30 may comprise conventional components and/or configuration/ approaches for translating an input clutch pressure command signal 26 into a corresponding control pressure signal 36.

Figure 2:
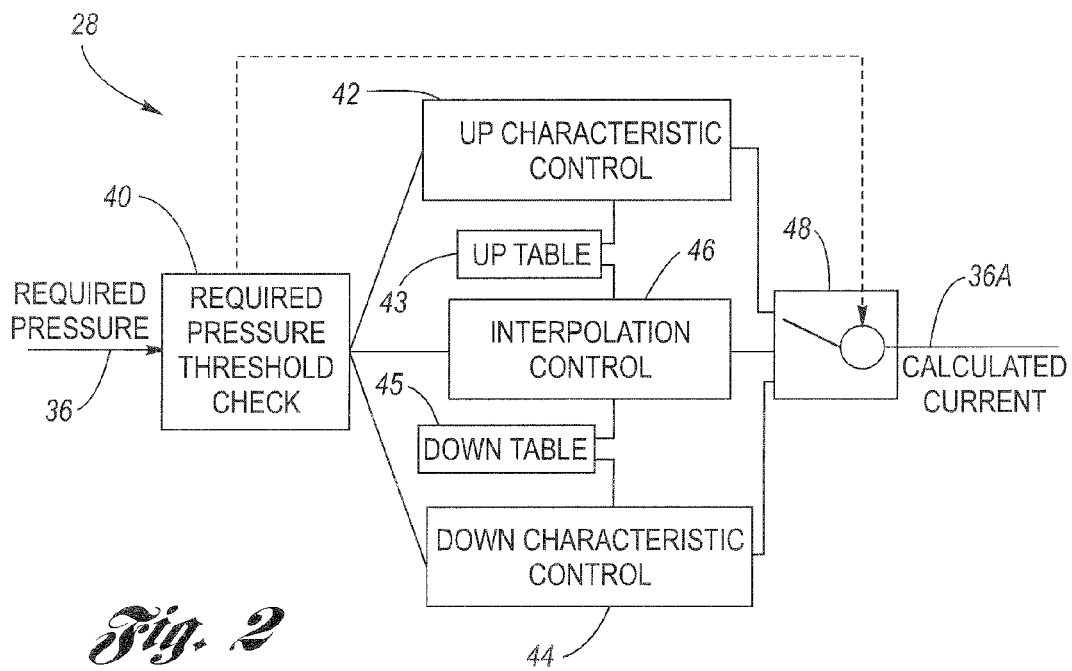
FIG. 2 is a block diagram showing the data flows involved in the interpolation strategy of FIG. 1.

FIG. 2 is a simplified block diagram showing, in greater detail, the data flows involved in the hysteresis interpolation strategy incorporated into pressure-to-current mapping block 28. It should be understood that the description provided in connection with FIG. 2 is functional in nature, and should not be construed to be limiting as to any particular structure performing such functions. FIG. 2 shows a mechanism 40 configured to determine whether a required pressure change threshold has been met, an up-characteristic control 42 which includes an up characteristic data structure 43 (e.g., data table), a down-characteristic control 44 which includes a down characteristic data structure 45 (e.g., data table), an interpolation control 46 and a selector 48. Each of the controls 42, 44 and 46, when active and/or selected, are configured to produce a respective required solenoid control current. As described below, mechanism 40 and selector 48 cooperate to determine which of the outputs from each of the controls 42, 44 and 46 should be the final required solenoid control current used to meet a desired control pressure.

As described in the Background section, the control current 36a for linear solenoid 14 typically differs in dependence on the control current direction. More specifically, a transition from a relatively low control current to a relatively high control current is considered an increasing or "up" current direction. Likewise, transitioning from a relatively high control current to a relatively low control current is considered a decreasing or "down" current direction. A linear solenoid typically has a characteristic response for each direction. In this regard, the up characteristic data structure and the down characteristic data structure contained in controls 42, 44 may each be implemented using conventional components and/or approaches known in the art. For example, it is known to develop an up P-I table (i.e., data structure) by first applying a series of increasing solenoid control current values to a linear solenoid and then recording the resulting control pressures, thereby establishing a series of I-P (current/pressure) data pairs. These data pairs may be optionally processed and then reversed so as to provide a P-I (pressure/current) table into which a desired control pressure can be input in order to output the required solenoid current. The same process can be followed to obtain a down P-I characteristic data structure.

A limitation of such data tables associated with controls 42, 44 is that they represent the linear solenoid's response at just a specified sized step, namely, the step size at which the original data underlying the table was obtained. For relatively large changes in pressure, therefore, either up or down, the up and down data tables may provide satisfactory and accurate results. However, for small changes, adherence to such tables begins to reveal the underlying limitations.

Accordingly, mechanism 40 is configured to determine whether a commanded control pressure change, as indicated by a difference between the present control pressure (e.g., could be represented by the previous control pressure command) and a new, desired control pressure (e.g., could be represented by the new control pressure command), meets a predetermined pressure change threshold. When the requested pressure change is a relatively large positive change (i.e., a positive pressure change that exceeds an "up" pressure change threshold), then the up-characteristic control 42 will be used. Likewise, when the requested pressure change is a relatively large negative change, or decrease in other words, then the down-characteristic control 44 will be used. However, when the requested control pressure change does not satisfy either the up or down pressure change thresholds, then the hysteresis interpolation methodology included in control 46 in accordance with the present invention will be used. As noted, mechanism 40 cooperates with selector 48 to select, based on the threshold checks described above, one of the outputs from blocks 42, 44 and 46 as the final, required solenoid control current that is output as required solenoid control current 36a. The use of interpolation, as will be described below, provides a more accurate value of solenoid control current needed to obtain the desired control pressure. In turn, this provides more accurate clutch pressure control, which can improve shift performance.

Figure 3:
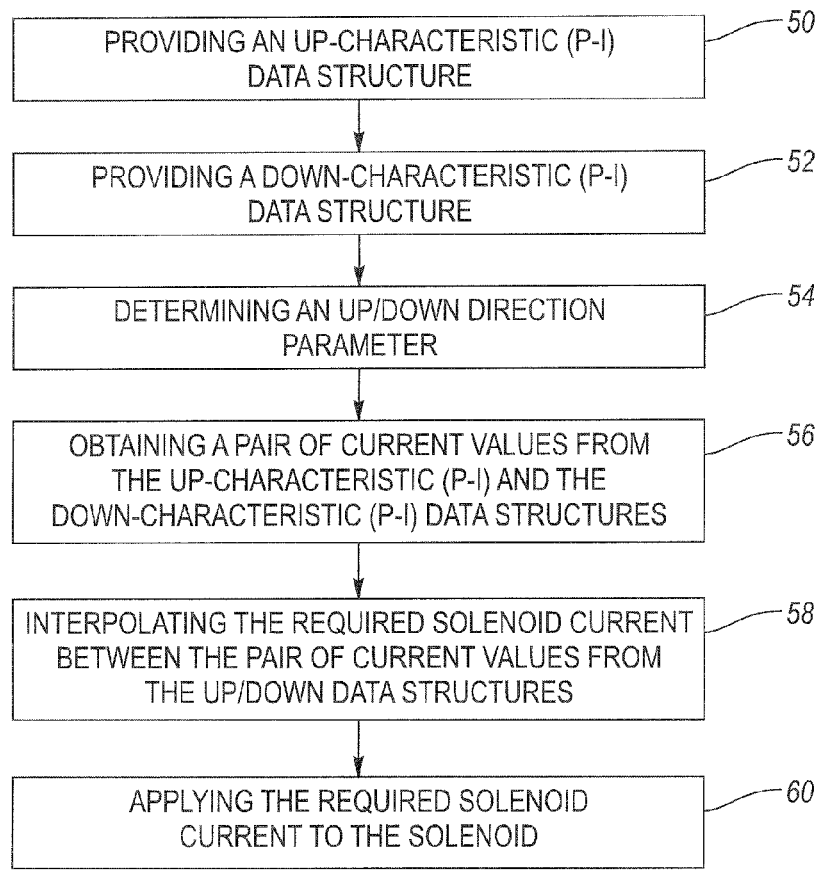
FIG. 3 is a simplified flowchart of a method for implementing the interpolation strategy of FIG. 2.

FIG. 3 is a simplified flowchart illustrating the hysteresis interpolation methodology of the present invention. The method includes steps 50, 52, 54, 56, 58 and 60.

Figure 4:
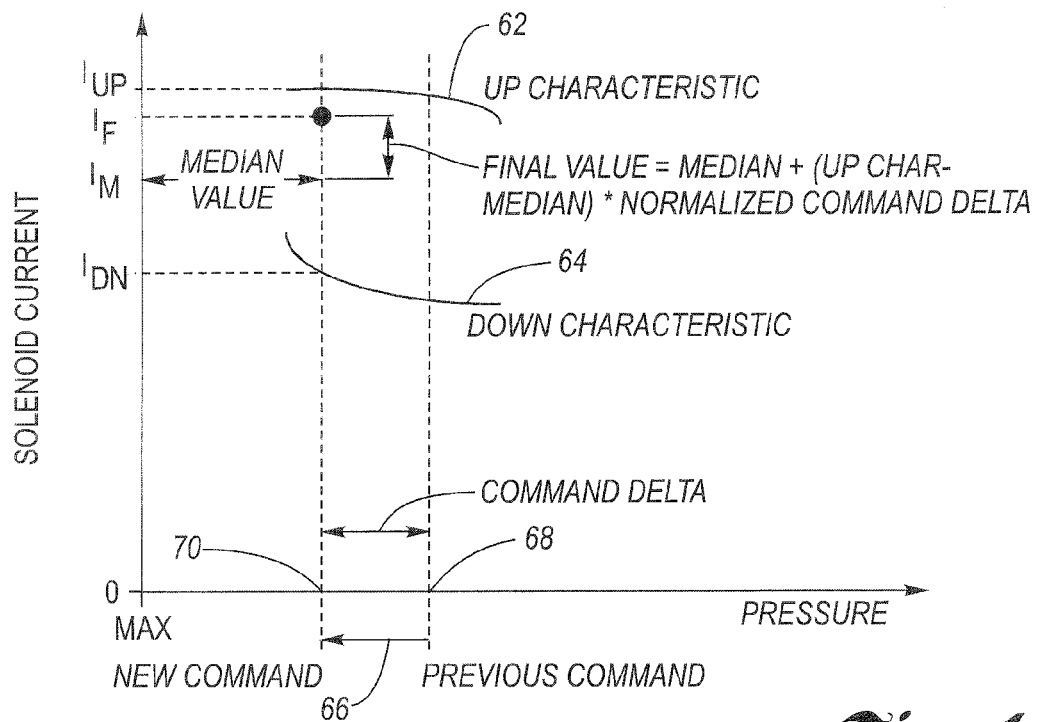
FIG. 4 is a simplified solenoid control current versus control pressure diagram illustrating graphically the hysteresis interpolation between the up and down P-I characteristics to obtain a required solenoid control current.

FIG. 4 is a simplified current-versus-pressure diagram illustrating an example of the interpolation methodology of FIG. 3. Note that the diagram of FIG. 4 pertains to a so-called "normally high" arrangement for linear solenoid 14. That is, when the solenoid control current is zero or near zero, the resulting control pressure output is at a maximum. As the solenoid control current increases, the control pressure decreases. Thus, in the diagram, control pressure increases occur from right-to-left. FIG. 4 further shows a solenoid pressure-versus-current (P-I) up characteristic curve 62, a solenoid pressure-versus-current (P-I) down characteristic curve 64, and a positive increase control pressure change (delta) 66. The delta pressure change 66 commanded may be determined based upon a prior or previous commanded control pressure level 68 and a newly commanded control pressure level 70.

Referring now to both FIGS. 3 and 4, a detailed description of the interpolation methodology will now be set forth. The interpolation method of the present invention begins in step 50.

Step 50 involves providing an up-characteristic data structure (e.g., table 43) including data corresponding to an up control pressure versus control current (P-I) characteristic for increasing control pressure. This is shown in FIG. 4 as curve 62.

Step 52 involves providing a down-characteristic data structure (e.g., table 45) including data corresponding to a down control pressure versus control current (P-I) characteristic for decreasing control pressure. This is shown in FIG. 4 as curve 64.

Step 54 involves determining an up/down direction parameter between the present control pressure and a desired, new control pressure. As shown in FIG. 4, given the right-to-left orientation described above, movement of the control pressure from pressure level 68 to pressure level 70 represents an increase in control pressure. Accordingly, in the example of FIG. 4, the method involves assigning an up direction value to the up/down direction parameter when the commanded (new) control pressure is greater than the prevailing (present) control pressure. The method may alternatively involve assigning a down direction value to the up/down direction parameter when the prevailing control pressure is greater than the commanded control pressure. It should be understood that up and down direction values are merely English language references for purposes of description herein only and are not intended to be limited solely to text or string based variables, and that as implemented in any particular embodiment, may involve the setting/resetting of bits, setting/resetting of flags, and/or other mechanisms well known to those of ordinary skill in the art.

Step 56 involves obtaining a pair of current values from the up-characteristic data structure (table 43) and the down-characteristic data structure (table 45) in accordance with the commanded (new) control pressure. The commanded control pressure corresponds to control pressure signal 36 (shown in FIG. 1 and FIG. 2). Thus, for a particular control pressure command, two current values are drawn from respective tables 43, 45. In FIG. 4, one of the two current value, designated $I_{DN}$, is taken from the down table 45, while the other one of the current value, designated $I_{UP}$, is taken from up table 43. It should be understood that the step of obtaining the pair of current values $I_{UP}$ and $I_{DN}$ may itself involve simple interpolation within each table 43, 45.

Step 58 involves interpolating a required solenoid control current 36a ($I_F$) between the pair of current values ($I_{UP}$, $I_{DN}$) as a function of the up/down direction parameter. In one embodiment, the final, required solenoid control current ($I_F$) may be determined in accordance with equation (1) below for an "up" control pressure change and equation (2) for a "down" control pressure change:

$$I_F = I_M + (I_{UP} - I_M) * (NF) \quad (1)$$

Where $I_F$ is the final required solenoid controll current 36a;

$I_{UP}$ is the current value taken from the up characteristic table 43 based on the new control pressure;

$I_M$ is the median current value of $I_{UP}$ and $I_{DN}$;

NF is a normalizing factor determined by dividing the requested control pressure charge 66 by the predetermined pressure change theshold.

$$I_F = I_M + (I_{DN} - I_M) * (NF) \quad (2)$$

Where $I_F$ is the final required solenoid control current 36a;

$I_{DN}$ is the current value taken from the down characteristic table 43 based on the new, control pressure;

$I_M$ is the median current value of $I_{UP}$ and $I_{DN}$;

NF is a normalizing factor determined by dividing the requested control pressure change 66 by the predetermined pressure change threshold.

Thus, evaluating equations (1) and (2) involves the step of determining a pressure difference between the present control pressure (i.e., can use the previous control pressure command) and the new, desired control pressure. Next, calculating a median current ($I_M$) value from the pair of current values ($I_{UP}$, $I_{DN}$) when the pressure difference is less than a predetermined pressure change threshold. Next, calculating a delta current value between the median current value ($I_M$) and one of the pair of current values selected depending on the up/down direction parameter (either $I_{UP}$ or $I_{DN}$). Next, determining a normalizing factor (NF) by dividing the requested pressure change 66 by the predetermined pressure change threshold. Next, multiplying the normalizing factor by the delta current value to produce an addend. Finally, adding the median value and the addend to obtain the required solenoid control current 36a, as seen in equations (1) and (2).

EXAMPLE

In FIG. 4, assume that the up pressure change threshold is 100 kPa, and the requested control pressure change amounts to 60 kPa (i.e., from control pressure level 68 to level 70). The requested control pressure change will involve the up characteristic 62 (table 43) since the new, desired control pressure command is greater than the existing, previous control pressure command. Also, since the requested pressure change is less than the predetermined pressure change threshold of 100 kPa, the output of hysteresis interpolation control 46 will be used. Respective current values are taken from the up characteristic 62 (table 43) and the down characteristic 64 (table 45), based on the new, requested control pressure. The pair of current values are shown as $I_{UP}$ and $I_{DN}$. The median value of the pair of current values is calculated, which is designated $I_M$. A delta current value is then calculated, which in the case of FIG. 4, is evaluated by ($I_{UP}$-$I_M$). For a down pressure request, ($I_{DN}$-$I_M$), a negative signed value. Next, a normalizing factor is calculated, which is 60 kPa/100 kPa or 0.60 in the example of FIG. 4. This normalizing factor effectively normalizes the requested delta control pressure. Next, the addend is calculated, and then added to the median. As shown graphically, approximately 0.60 of the difference between the median and the current value in the up table is bridged due to the proportionality factor. The final, required control current 36a, designated $I_F$, is shown in FIG. 4. The foregoing methodology will result in a solenoid control current that provides improved precision in controlling the overall clutch pressure by more accurately producing the control pressure in the first instance.

Finally, in FIG. 3, step 60 involves applying the required solenoid control current 36a to the solenoid 14.

Figure 5:
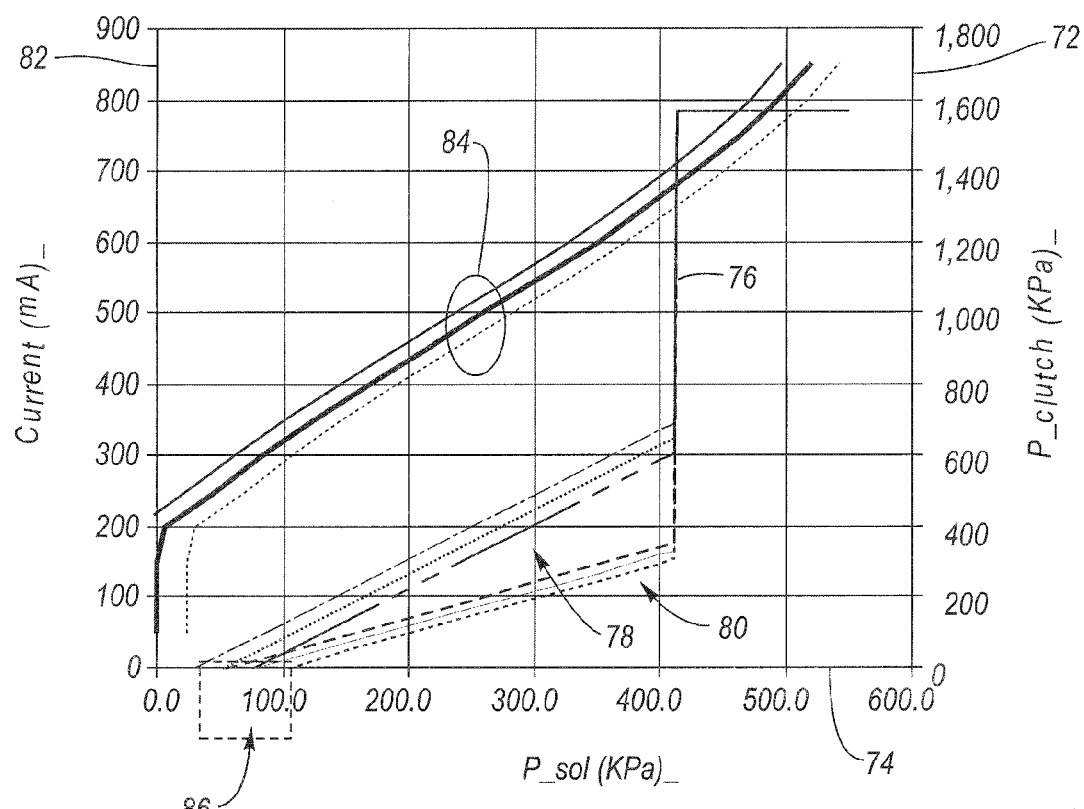
FIG. 5 is a simplified multi-parameter diagram showing the relationships between clutch pressure, control (solenoid) pressure and control (solenoid) current and the differing gains in dependence on the gear state of the transmission.

FIG. 5, a simplified multi-parameter diagram shows the relationship between clutch pressure, control (solenoid) pressure and control (solenoid) current and the differing gains in dependence on the gear state. As described above, control arrangement 30 includes a variable gain function that improves generation of an accurate control pressure, which in turn improves the accuracy of the clutch pressure. At the right-hand side of the diagram, the Y-axis 72 shows a clutch pressure plotted against the control pressure (solenoid pressure) on the X-axis 74. Traces 76 illustrate the relationship between clutch pressure and control (solenoid) pressure. As shown, there are two distinct regions having their own, distinct gains, a first gain designated in region 78 and a second gain designated in region 80. The first gain and second gain correspond to two different gear states of the transmission. As shown in the heading, the solenoid being plotted is the "26" solenoid involved in effecting changes to a second gear and a sixth gear. In FIG. 4, first gain 78 corresponds to the second gear of the transmission, while second gain 80 corresponds to the sixth gear of the transmission. Since the hydraulic hardware (circuit) controlled by the solenoid assumes differing configurations in dependence on the gear state, the solenoid exhibits two distinct gains as function of the gear state. As also shown, there is an offset 86 (due to the force needed to overcome a solenoid spring) that is taken into account when determining the required solenoid control current for a given desired clutch pressure. The a required solenoid current, plotted at the left-hand side of the chart on Y-axis 82, can be obtained from the diagram for a desired control (solenoid) pressure using traces 84.

In view of the above, clutch pressure may be characterized by equation (3) below:

Clutch Pressure=Gain*(Control Pressure +Offset).   (3)

Equation (3) may be rearranged to solve a Control Pressure, as in equation (4):

Control Pressure+Clutch Pressure Gain−Offset.   (4)

In equation (4), the Gain is determined, as described above, in accordance with a gear state of the transmission. The offset 86 is determined in advance. Therefore, control arrangement 30 may be configured (e.g., programmed) to generate a control pressure signal 36 in response to a desired, clutch pressure command 26, in accordance with the above equation (4). A method in accordance with the gear-state dependent variable gain aspect of the present invention includes a number of steps.

The first step involves providing a solenoid-operated electro-hydraulic pressure control module including a linear solenoid, as described in connection with FIG. 1, having an outlet configured to provide fluid at an outlet pressure that is variable in accordance with a control (solenoid) current signal. The outlet is in fluid communication with the clutch.

The next step involves providing a clutch pressure command signal indicative of a desired clutch pressure.

The next steps include (i) associating a first gain with the solenoid for a first gear state of the transmission, and (ii) associating a second gain with the solenoid for a second gear state of the transmission.

The next step involves determining a control (solenoid) pressure based on the clutch pressure command signal and one of the first and second gains in dependence on the gear state. As set forth in equation (4), a further refinement of the calculation may include determining a control (solenoid) pressure further based on an offset parameter associated with the solenoid.

Through the foregoing, a more accurate control pressure, and hence a more accurate clutch pressure, may be obtained.

Mapping block 28 and control arrangement 30 may be implemented, in one embodiment, in an electronic controller, which may be separate (or included with) the control unit in which the main application control program 25 executes. In this regard, such an electronic controller may include conventional processing apparatus known in the art, capable of executing pre-programmed instructions stored in an associated memory, all performing in accordance with the functionality described herein. That is, it is contemplated that the processes described herein will be programmed in a preferred embodiment, with the resulting software code being stored in the associated memory. Implementation of the present invention, in software, in view of the foregoing enabling description, would require no more than routine application of programming skills by one of ordinary skill in the art. Such an electronic controller may further be of the type having both ROM, RAM, a combination of non-volatile and volatile (modifiable) memory so that the software can be stored and yet allow storage and processing of dynamically produced data and/or signals.

While particular embodiments of the invention have been shown and described, numerous variations and alternate embodiments will occur to those skilled in the art. Accordingly, it is intended that the invention be limited only in terms of the appended claims.

The invention claimed is:

1. A method of controlling a solenoid in a solenoid-operated electro-hydraulic pressure control module where a solenoid output pressure defining a control pressure varies in accordance with a solenoid control current, said method comprising the steps of:
   providing an up-characteristic data structure including data corresponding to an up control pressure versus control current (P-I) characteristic for increasing control pressure;
   providing a down-characteristic data structure including data corresponding to a down control pressure versus control current (P-I) characteristic for a decreasing control pressure;
   determining an up/down direction parameter associated with a prevailing control pressure and a commanded control pressure;
   obtaining a pair of current values from the up-characteristic data structure and the down-characteristic data structure in accordance with the commanded control pressure;
   interpolating a required solenoid control current between the pair of current values as a function of the up/down direction parameter; and
   applying the required solenoid control current to the solenoid.

2. The method of claim 1 wherein said step of determining an up/down direction parameter includes the substeps of:
   assigning an up value to the up/down direction parameter when the commanded control pressure is greater than the prevailing control pressure;
   assigning a down value to the up/down direction parameter when the prevailing control pressure is greater than the commanded control pressure.

3. The method of claim 1 wherein said interpolating step includes the substeps of:
   determining a pressure difference between the prevailing control pressure and the commanded control pressure;
   calculating a median current value from the pair of current values when the pressure difference is less than a pressure threshold;
   calculating a delta current value between the median value and one of the pair of current values as a function of the up/down direction parameter;
   determining a normalizing factor by dividing the commanded pressure difference by the pressure threshold;
   multiplying the normalizing factor by the delta current value to produce an addend;
   adding the median current value and the addend to obtain the required solenoid control current.

4. A method for controlling hydraulic fluid to a clutch in a vehicle automatic speed change transmission where the clutch is configured to couple a pair of members at least one of which is rotatable, comprising the steps of:
   providing a solenoid-operated electro-hydraulic pressure control module having an outlet configured to provide fluid at an outlet pressure that is variable in accordance with a control current signal, said outlet being in fluid communication with said clutch, said electro-hydraulic module having a solenoid;
   providing a clutch pressure command signal indicative of a desired clutch pressure;
   associating a first gain with the solenoid for a first gear state of the transmission;
   associating a second gain with the solenoid for a second gear state of the transmission; and
   determining a required control pressure based on the desired clutch pressure and one of the first and second gains in dependence on the gear state.

5. The method of claim 4 wherein said step of determining a required control pressure is further based on an offset parameter associated with the solenoid.

* * * * *